Aug. 26, 1969  E. L. MORAGNE  3,463,319
ELECTROMAGNETIC SEPARATOR
Filed Oct. 6, 1967  2 Sheets-Sheet 1
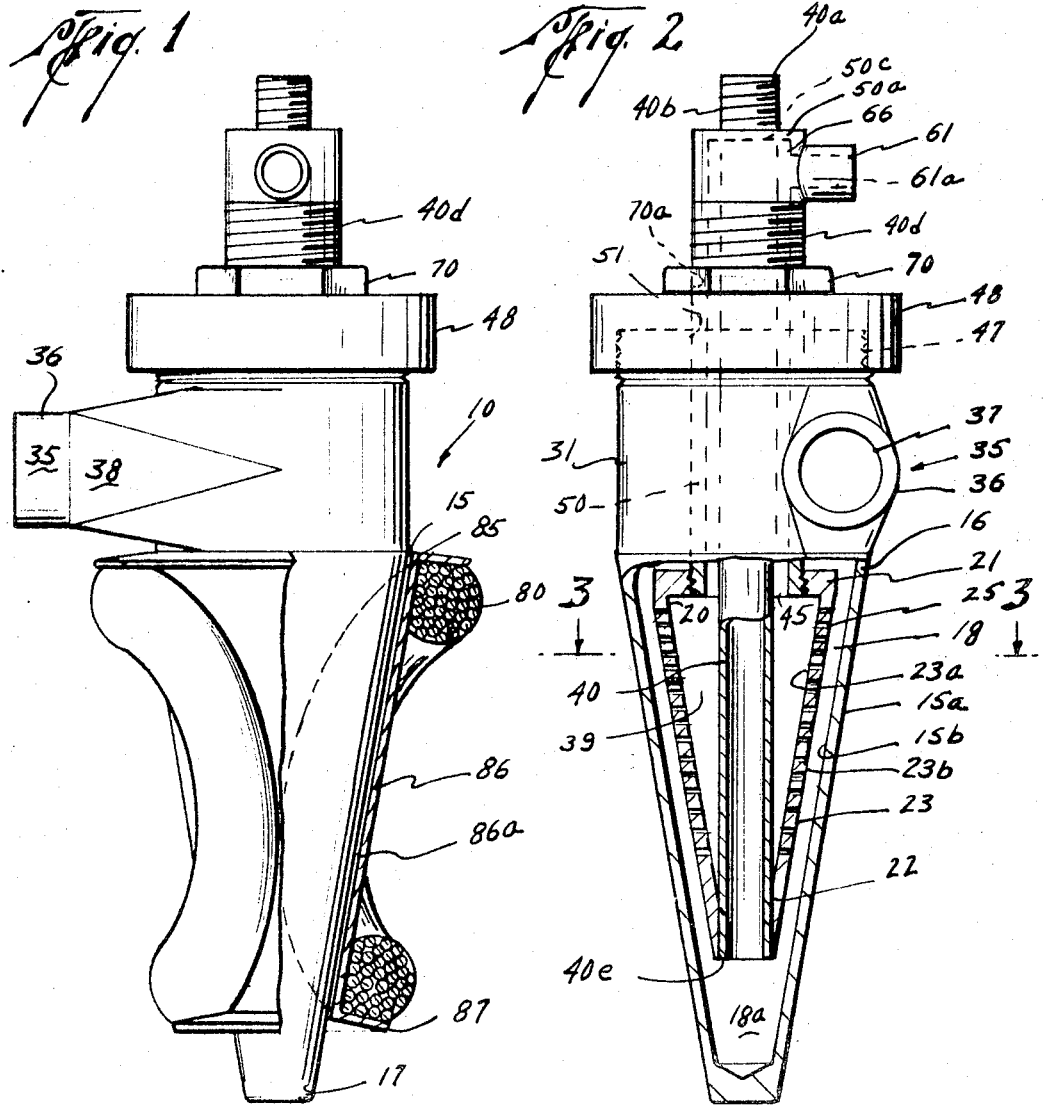
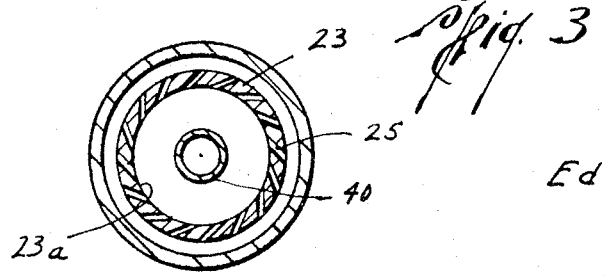
Edward L. Moragne
INVENTOR
BY
Hayden Pravel Wilson & Matthews
ATTORNEYS

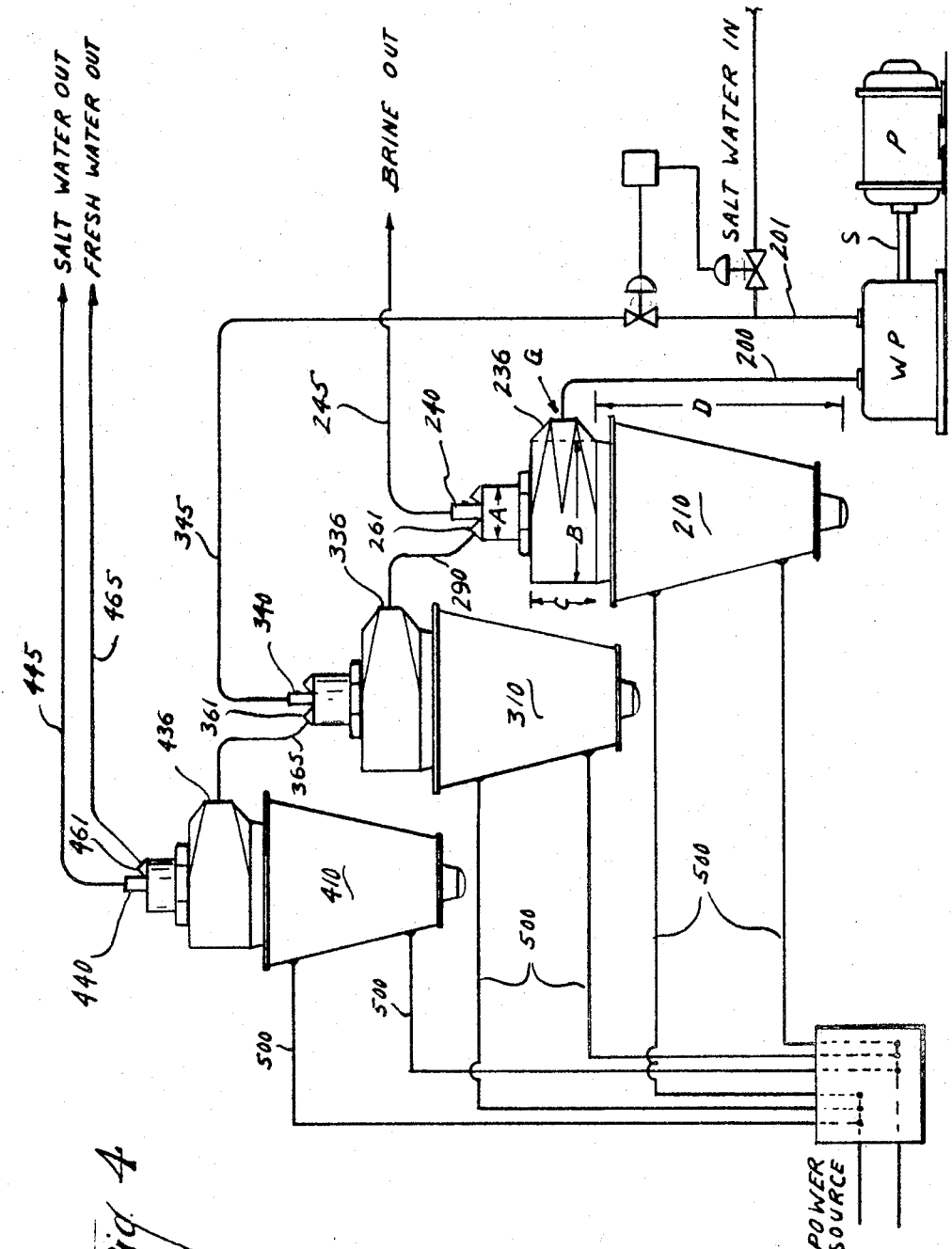

United States Patent Office 3,463,319
Patented Aug. 26, 1969

3,463,319
ELECTROMAGNETIC SEPARATOR
Edward L. Moragne, 4723 Nenana, Houston, Tex. 77035
Filed Oct. 6, 1967, Ser. No. 673,508
Int. Cl. B01d 35/06; B03c 1/02
U.S. Cl. 210—223                              10 Claims

ABSTRACT OF THE DISCLOSURE

Matter is inserted between two concentrically positioned cones at a desired velocity and the velocity of the matter between the cones increases due to a decreasing radius of the cones. The cones are subjected to a shaped concentric electromagnetic field which causes ions to be attracted toward the inner surface of the outer cone and pions to be attracted toward the outer surface of the inner concentric cone. A plurality of holes in the inner cone enables the pions to be removed and separated from the ions which are then removed from the separator.

Also, matter having a heavier mass is thrown to the outside of the downwardly spiraling mass as it is removed with the ions while lighter mass is skimmed off and removed from the separator along with the pions.

BACKGROUND OF THE INVENTION

Field of the invention

This invention relates to an apparatus for separating matter and more particularly to a new and improved electromagnetic separator.

Description of the prior art

While many separators are known, at the present time such separators are complex, require many electrical, mechanical and chemical parts and portions and are very expensive to construct. For example, water desalination previously occurred by reverse osmosis, freezing through butane or vacuum flash freezing, and distillation, all of which methods are complex and expensive. Further, desalination of sea water and the like requires the construction of a desalination plant using one of the above methods.

Summary of the invention

Briefly, the present invention relates to an electromagnetic separator apparatus including spaced concentric cones subjected to a concentric electromagnetic field wherein pions react to the field and enter openings in the inner cone and ions are removed from the bottom of the apparatus and wherein heavier matter is removed with the ions and lighter matter is removed with the pions.

An object of the present invention is to provide a new and improved electromagnetic separator apparatus.

Yet another object of the present invention is to provide a new and improved electromagnetic separator apparatus that is inexpensive in its construction.

Still yet another object of the present invention is to provide a new and improved electromagnetic separator apparatus including concentrically spaced cones wherein matter is separated by a concentrically charged electromagnetic field to cause ions and pions to separate and the matter having a heavier mass is separated from matter having a lighter mass.

Still another object of the present invention is to provide a new and improved desalinator for removing salt from sea water.

Brief description of the drawing

FIG. 1 is a perspective view, partly in section, illustrating the electromagnetic separator apparatus of the present invention;

FIG. 2 is a cross-sectional view of the internal cone of the electromagnetic separator apparatus of the present invention in relation to the other apparatus;

FIG. 3 is a sectional view along line 3—3 of FIG. 2 illustrating a plurality of tangential holes in the inner cone; and FIG. 4 is a view of a plurality of the electromagnetic separator apparatus of the present invention connected together to form a desalination plant.

Description of the preferred embodiments

Attention is directed to FIGS. 1 and 2 of the present invention wherein the electromagnetic separator of the present invention is generally designated by the numeral 10 and is illustrated as including an outer cone 15 having an outer wall 15a and an inner wall 15b and an open upper and lower closed end 16 and 17, respectively. The side wall 15 decreases in diameter from the upper open end 16 to the lower closed end 17, and the open end 16 communicates with opening 18 in the cone 15. It is to be understood that the cone 15 may be constructed of any suitable material such as iron, steel, and the like.

As illustrated in FIG. 2, a concentric inner cone 20 is positioned in the opening 18 and includes upper and lower ends 21 and 22 and side walls 23 which are parallel to the respective upper and lower ends 16 and 17 and side walls of the outer cone 15.

The concentric inner cone 20 is spaced from the inner wall 15b of the side wall in the opening 18. The side walls 23 of the inner cone 20 include an inner surface 23a and an outer surface 23b which communicate with each other through a series or plurality of spaced openings or ports 25 which are illustrated as being positioned or drilled at a 45° angle relative to a line normal to the inner surface of the inner cone 20.

As illustrated in FIGS. 1, 2, and 3, an introduction chamber 31 is secured with the outer cone 15 adjacent its open upper end 16 and communicates with the opening 18 in the outer cone 15. An inlet port 35 is secured with any suitable system or tubular member for introducing matter into the electromagnetic separator 10 of the present invention. The inlet port or opening 35 includes end 36 with an opening 37 which communicates with the introduction chamber 31. It should also be noted that the entrance member or port 35 includes a tapered portion 38 which is aligned tangentially with the inner side wall of the chamber 31 and inner surface 15b of the outer cone 15.

As illustrated in FIG. 2, an opening 39 in the inner cone 20 receives a removal means or tubular member 40 which extends downwardly and is secured with the lower end 22 of the inner cone 20. The member 40 extends upwardly through an opening 45 in the upper end 21 of the inner cone 20 as will be brought out hereinbelow. The outer cone 15 and the introduction chamber 31 may be integrally formed or may be two separate pieces which are secured together by any suitable means such as welding and the like. The upper portion of the introduction chamber 30 includes threads 47 for threadedly receiving and engaging similar threads 47 on a nut head and cover plate 48. A tubular member 50 is threadedly secured with the upper end 21 of the inner cone 20 and extends upwardly through an opening 51 in the cover head 48. The tubular member 50 is closed at one end 50a and enables the opening 39 in the inner cone 20 to communicate with the tubular member 50.

The tubular member 40 extends upwardly through the opening 45 in the upper end 21 of the inner cone 20 as brought out hereinabove and extends parallel and concentrically to the tubular member 50 and out through an opening 50c in the end 50a so that a portion 40a of such member with its threaded end 40b is illustrated as extending through the head 50a. A side port or opening 60 in the tubular member 50 adjacent the upper end 50a thereof is provided with a suitable connection member 61 having internal threads 61a for receiving suitable tubular members to enable the opening 39 in the inner cone 20 to communicate with the opening 60. As also illustrated in FIGS. 1, 2, and 3, a suspension nut 70 is provided with threads 70a for threadedly engaging the external threads 40d on the tubular member 40 for suspending the inner cone 20 in the opening 18 of the outer cone 15. It should be apparent that if it is desired to move the inner cone 20 upwardly and downwardly relative to the outer cone, that the adjustable nut can be rotated counterclockwise or clockwise, respectively, for such adjustment.

As illustrated in FIG. 1, a pair of electrical coils 80 is secured in a suitable desired manner adjacent the upper end 85 of a retainer member 86. Hold member 86 includes side walls 86a which are parallel to the side walls 15 of the outer cone and include a flared base 87 and an upper flared base 90. It should be understood that the hold member 86 is used for maintaining the electromagnetic separator 10 of the present invention in an upright position and for enabling the pair of coils 80 to be positioned as desired according to the matter that will be injected into the eletcromagnetic separator 10 of the present invention. The coils 80 are mounted, as illustrated in FIG. 1, to conform to the cone shape of member 86 so that an induced electromagnetic field is concentrically shaped parallel to the cones 15 and 20.

Before proceeding further, some theory of the electromagnetic separator 10 of the present invention is in order. The electromagnetic separator 10 of the present invention or a plurality of such separators 10 connected in series is used to separate matter such as solids, liquids, and gases into each element's natural density of specific gravity of particle size, depending upon the matter being separated. For example, the electromagnetic separator 10 of the present invention can be used for the removal of salt from sea water, or other elements from sea water, water from oil, water from gas, sulfur from oil or gas, U–238 from U–235, or any type of matter from air or gases.

There are several principal laws of physics involved such as the electrolytic dissociation theory, the magnetic induction theory, the density theory, and the calculation of specific gravity.

In the design criteria of the present invention, the laws of separation of various matter may be expressed as follows:

(1) Separation of solids from air and gas:

$$V = 15{,}000 \left(\frac{G}{G-1}\right)\sqrt{D}$$

Where:

V=particle velocity, f.p.m.
G=specific gravity of solids.
D=particle diameter in inches.

Air gas volume per pound of solids is generally given as: 100 cfm. per pound of lightweight solids to 30 cfm. per pound of heavy solids.

(2) Solids from liquids:

$$V = 700 \sqrt{w/\text{ft.}^3}$$

Where:

W/ft.$^3$=weight per cubic foot of the solids.

The liquid volume per pound of solid ratio will be similar to air volumes. For the electrical field calculation $B=UH$ where permeability=$U$ and magnetic field=$H$.

$B=H=4\pi$ where magnetic moment=$I$ and magnetic susceptibility $$K = \frac{I}{H}$$

Thus, $U = 1 + 4\ K$.

(3) Separation of a gas from gas:

$$V = 30{,}000 \frac{G}{G-1}\sqrt{D}$$

Where:

V=particle velocity f.p.m.
G=specific gravity of heavier gas.
G−1=specific gravity of lighter gas.
D=volume of heavier gas in pounds per cubic foot.

Generally, the electrical field to be used is based on the selection of which ion is to be selected for separation irrespective of the matter being separated and is calculated on the basis of the Lamar frequency in megacycles at 10 gauss, of the heavier gas or matter being separated.

The formula is based on International Gauss=2.0213 ampere-turns per inch, 6.452 lines per square inch; $1 \times 10^5$ gamma; $2.99796 \times 10^{10}$ electrostatic c.g.s. units.

For example, in separation of liquid solutions, the magnetic susceptibility of NaCl at 18° C. is 0.499; 10—6 c.g.s. or $x=k/d$.

Where:

$x$=the substance matter.
$k$=the relation to volume susceptibility.
$d$=the density of the substance.

(4) Separation of liquid from liquid.

$$V = 12{,}000 \left(\frac{G}{G-1}\right)\sqrt{D}$$

Where:

V=liquid velocity f.p.m.
G=specific gravity of heavier liquid.
G−1=specific gravity of lighter liquid.
D=volume of heavier liquid in pounds per cubic foot.

In the separation of most solutions, such as fresh water from salt to water, it is necessary to determine the magnetic susceptibility of the ion desired to be separated as will be brought out hereinbelow.

It is necessary to design the electromagnetic separator 10 of the present invention such that the concentric electromagnetic field produced by the coils 80 produces a sufficient field to ionize the atoms of the article or matter such that due to the electrolytic dissociation theory $$\left(H = \frac{q}{er^2}\right)$$

where field strength=$H$; dielectric constant=$e$; charge particle=$q$; and $r$=radius of the atom) pions are attracted toward the inner surface 15b of the outer cone 15 and ions are attracted toward the outer surface 23b and ports 25 of the inner cone 20 when the matter is injected into the electromagnetic separator 10 of the present invention.

In the operation of the invention, the matter to be separated is injected from a suitable source into the tangential inlet port 35 at a desired velocity. The matter is inserted into the introduction chamber 31 tangentially, and spirals downwardly between the outer and inner cones 15 and 20, respectively. As the matter spirals downwardly, the decreasing radius of the inner and outer cones 15 and 20, respectively, causes an increase in the velocity of the matter.

As brought out hereinabove, the electromagnetic field is based on the selection of which ion is to be separated and is calculated on the basis of the Lamar frequency in megacycles at 10 gauss of the ion being separated. As the matter is subjected to the electromagnetic field, the ions will be attracted toward the inner surface 15b of the outer cone 15 and the pions will either remain stationary or move inwardly toward the outer surface 23a of the inner cone 20. The lighter pions that reach the outer surface 23b of the inner cone 20 enter the tangential openings 25 in the inner cone 20 and flow into the opening 39. Also, matter introduced between the cones 15 and 20 that will separate because of mass is permitted to do so with the heavier mass being thrown toward the inner surface 15b of the outer cone 15 and the lighter mass being moved inwardly as it spirals downwardly toward the outer surface 23a of the inner cone 20. The material having the lighter mass is "skimmed" such that the lighter mass enters the opening 39 by passing through the ports 25. The pions and/or lighter mass in the opening 39 are removed upwardly through the tubular member 50 and through the port 60 and the member 61 secured therewith to a suitable system for storage or into another bank of electromagnetic separators 10 of the present invention as will be illustrated hereinbelow. The ions and/or heavier matter eventually reach the bottom portion 18a of the opening 18 by spiraling downwardly and enter the opening 40e in the tubular member 40. The ions and/or heavier matters are removed upwardly through the tubular member 40 and out the opening therein.

Of course, the first phase in the design of the electromagnetic separator 10 of the present invention is to determine the material to be separated. Secondly, the material's magnetic susceptibility, magnetic moment, and specific gravity must be calculated. Then, the exact velocity required to set up centripetal force is calculated to cause the matter to continually spiral downwardly until it reaches the bottom portion 18a of the outer cone 15. After calculation of this force, the inlet velocity or velocity necessary to reach this force is determined. With the determination of the inlet velocity, the unit may be designed as follows:

(1) As illustrated on one of the electromagnetic separator units 10 of the present invention (FIG. 4), A=one diameter based on 6 times the inlet velocity;

(2) B=2 times the diameter of A or 2 times 6 times the inlet velocity;

(3) C=1½ times 6 times the inlet velocity;

(4) D=from 2½ to 4.3 times 6 times the inlet velocity, 2.5 on light particle size and 4.3 on heavy particle size.

As illustrated in FIG. 4, a suitable motor P is connected through shaft S to a water pump WP. The water pump WP is provided with a suitable conduit 200 which is secured with the inlet head 236. The solution is subjected to a suitable calculated magnetic field as brought out hereinabove, and the pions are removed through the member 261 and into tubular member 290 for inlet to the next stage separator apparatus 210 through the head 336.

A suitable source of salt water is designated at "Salt Water In" and is inserted or communicates with the tubular member 201 which in turn communicates with the water pump WP. The outlet 240 for the ions of the separator apparatus 210 is secured with a suitable tubular member 245 which is used for removal of the brine and is designated as "Brine Out." The outlet 361 for the pions of the separator apparatus 310 is secured with a tubular member 365 which in turn is connected to the inlet port 436 of the electromagnetic separator 410 for introduction of the matter into the separator apparatus 410. The ions are removed from the separator apparatus 310 through the port 340 and are secured with the tubular member 345 which is used as a reflux line to circulate the ions back through the water pump WP and once again through the tubular member 200 and to the inlet 236 of the separator apparatus 210. The pions are removed from the separator apparatus 410 through the port 461 and the tubular member 465 and is designated as "Fresh Water Out." The ions are removed through the port 440 and the tubular member 445 and are designated as "Salt Water Out."

The electromagnetic field is provided by a suitable power source which is connected through electrical leads 500 with each of the separator apparatus 210, 310, and 410 as brought out hereinabove.

I claim:

1. An electromagnetic separator comprising:
   (a) an outer cone-shaped enclosure having an open upper end and closed, parallel, lower end, said cone-shaped enclosure having an opening therein;
   (b) a spaced concentrically shaped inner cone positioned in said opening of said outer cone, said inner cone having a plurality of ports therein and an opening in the center thereof to enable said opening in said inner cone to communicate with said space between said cones;
   (c) an introduction chamber mounted with said upper end of said outer cone, said chamber having an inlet port for introducing matter tangentially into said chamber and into said space between said inner and outer cone;
   (d) said inner and outer cones decreasing in radius downwardly toward said lower end wherein the velocity of the matter is increased as the matter moves downwardly;
   (e) coil means secured with said outer cone for producing a concentric electromagnetic field in said space between said cones wherein said matter is electrically charged and pions in the matter and matter having a lighter mass move toward said ports in said inner cone and wherein the pions and lighter matter enter said opening in said inner concentric cone through said ports;
   (f) tubular means for removing the pions and lighter mass matter from said inner cone; and
   (g) tubular means for removing the ions and matter having a heavier mass from the space between said cones.

2. The structure as set forth in claim 1 wherein said tubular means for removing the ions and heavier mass matter from said space between said cones extends downwardly through said opening in said inner cone adjacent the lower closed end of said outer cone.

3. The structure as set forth in claim 1 wherein said tubular member communicating with the opening in said inner cone is secured with succeeding inlet ports of succeeding separators to form a series of said separators for continuous separation of matter.

4. An electromagnetic separator for separating matter into different components comprising:
   (a) container means for receiving the matter to be separated;
   (b) inlet means for introducing matter into said container means;
   (c) first discharge means for continuously discharging portions of the matter from said container means;
   (d) collector means for continuously collecting portions of the matter from said container means;
   (e) second discharge means for continuously discharging matter collected by said collector means; and
   (f) field inducing means for inducing a force field in the matter contained in said container means.

5. The electromagnetic separator as defined in claim 4 wherein:
   (a) said container means includes a substantially conical internal surface for directing the matter received from said inlet means in a spiraling flow path;
   (b) said collector means includes a substantially conical outer surface and a hollow interior with said outer surface disposed within and spaced from said internal surface of said container means; and
   (c) said collector means includes a plurality of collecting ports extending between said outer surface and said hollow interior of said collector means for conducting matter from said container means into said hollow interior of said collector means.

6. The electromagnetic separator as defined in claim 5 wherein:
  (a) said collecting ports extend through said collector means at an acute angle with respect to a line normal to said outer surface of said collector means for assisting in directing the spirally flowing matter into said hollow interior of said collector means;
  (b) said first discharge means includes a first tubular conduit extending axially through said hollow interior of said collector means;
  (c) said first tubular conduit includes first and second axially spaced ends with said first end opening into said container means and said second end opening externally of said container means and said collector means;
  (d) said second discharge means includes a second tubular having third and four axially spaced ends; and
  (e) said third end of said second tubular conduit opening into said hollow interior of said collector means and said fourth end opening externally of said collector means and said container means.

7. The electromagnetic separator as defined in claim 6 wherein:
  (a) said field inducing means includes at least one electrical coil means disposed externally of said container means;
  (b) said container means, collector means, first and second tubular conduits are coaxially disposed; and
  (c) said first tubular conduit is disposed internally of said second tubular conduit.

8. The electromagnetic separator as defined in claim 5 including adjustment means for varying the spacing between said collector means and said container means.

9. The electromagnetic separator as defined in claim 6 further including adjustment means for varying the spacing between said collector means and said container means.

10. The electromagnetic separator as defined in claim 7 further including:
  (a) adjustment means for varying the spacing between said collector means and said container means; and
  (b) a plurality of electrical coil means disposed externally of said container means.

References Cited

UNITED STATES PATENTS

| | | | |
|---|---|---|---|
| 1,176,732 | 3/1916 | Bowser | 210—304 |
| 2,533,966 | 12/1950 | Simmons | 55—3 X |
| 3,399,134 | 8/1968 | Schoua et al. | 209—232 X |

REUBEN FRIEDMAN, Primary Examiner

T. A. GRANGER, Assistant Examiner

U.S. Cl. X.R.

209—223, 232